United States Patent [19]
Makofka et al.

[11] Patent Number: 4,567,716
[45] Date of Patent: Feb. 4, 1986

[54] FULL QUADRANT CROP LIFTER FOR DISC MOWER-CONDITIONERS

[75] Inventors: Stanley J. Makofka, New Holland; Philip J. Ehrhart, Narvon; Kenneth W. McLean, New Holland, all of Pa.

[73] Assignee: Sperry Corporation, New Holland, Pa.

[21] Appl. No.: 592,644

[22] Filed: Mar. 23, 1984

[51] Int. Cl.$^4$ .......... A01D 34/66
[52] U.S. Cl. .......... 56/13.6; 56/295; 56/DIG. 1
[58] Field of Search .......... 56/6, 13.6, DIG. 1, 56/192, 295

[56] References Cited

U.S. PATENT DOCUMENTS

| | | | |
|---|---|---|---|
| 3,555,798 | 1/1971 | Eder | 56/295 |
| 3,905,182 | 9/1975 | Geier | 56/13.6 |
| 4,103,476 | 8/1978 | Oosterling et al. | 56/295 |
| 4,110,959 | 9/1978 | Oosterling et al. | 56/6 |
| 4,177,625 | 12/1979 | Knight et al. | 56/DIG. 1 |
| 4,185,445 | 1/1980 | van der Lely | 56/6 |
| 4,188,773 | 2/1980 | Kaetzel | 56/DIG. 1 |
| 4,426,828 | 1/1984 | Neurburg | 56/6 |

FOREIGN PATENT DOCUMENTS

| | | | |
|---|---|---|---|
| 2282216 | 3/1976 | France | 56/13.6 |
| 1326900 | 8/1973 | United Kingdom | 56/295 |
| 2058536 | 4/1981 | United Kingdom | 56/13.6 |

*Primary Examiner*—Paul J. Hirsch
*Attorney, Agent, or Firm*—Larry W. Miller; Frank A. Seemar; Darrell F. Marquette

[57] ABSTRACT

A disc mower-conditioner having a disc cutterbar with transversely spaced rotatable disc cutters to sever standing crop material by an impact action and a rotatable conditioning mechanism mounted rearwardly of the cutterbar to receive and condition severed crop material is disclosed wherein each disc cutter is provided with a crop lifter affixed to the peripheral portion of the disc cutter adjacent each knife in leading relationship thereto. The crop lifter has an inclined ramp extending substantially a full guadrant of the disc cutter and being operable to lift previously severed crop material away from the corresponding knife before the knife severs standing crop material and to feed the severed crop material into the conditioning mechanism. The top of the crop lifter is positioned in substantially the same plane as the raised central portion of the disc cutter for properly lifting the severed crop material toward the conditioning mechanism and for protecting the hardware detachably fastening the knife to the disc cutter.

10 Claims, 24 Drawing Figures

10
12
14
15
18
18
20
21
21
22
25
26
28
28
29
30
32
34
39
40
40
40
40
45
45

43
41
42
40
48
54
52
53
55
44
57
56
50
59
47
45
46

40
46
66
45
47
64
60
65
49
69
68
62
48
41
42
44
64
47
45
66

12
14
66
15
64
60
65
69
68
62
13

65
64
60
66
62
68
67
69

64
65
69
62
60

64
60
66
65
62
67
69

60
65
64
66
67
62
68
69

70
75
84
86
76
78
84
71
72
75
84
75
77
84
86
76
78
75
74

74
82
70
75
75
72
72
45
77
84
79
78
71
84
76
78
77
79
84
84
72
72
18
76
75
75
74
82
18

70
84
71
73
84
86
79
78
86
45
47
81
75
74
82
74
81
76
77

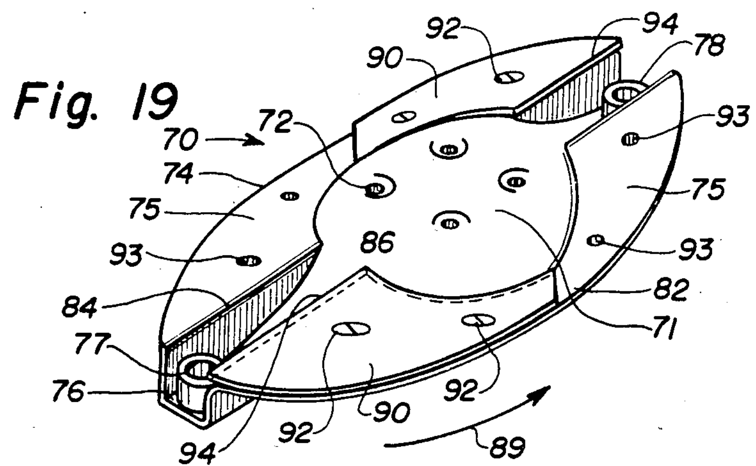
Fig. 19
70
72
74
75
93
84
77
76
94
92
90
86
92
94
78
93
75
93
82
71
92
90
89
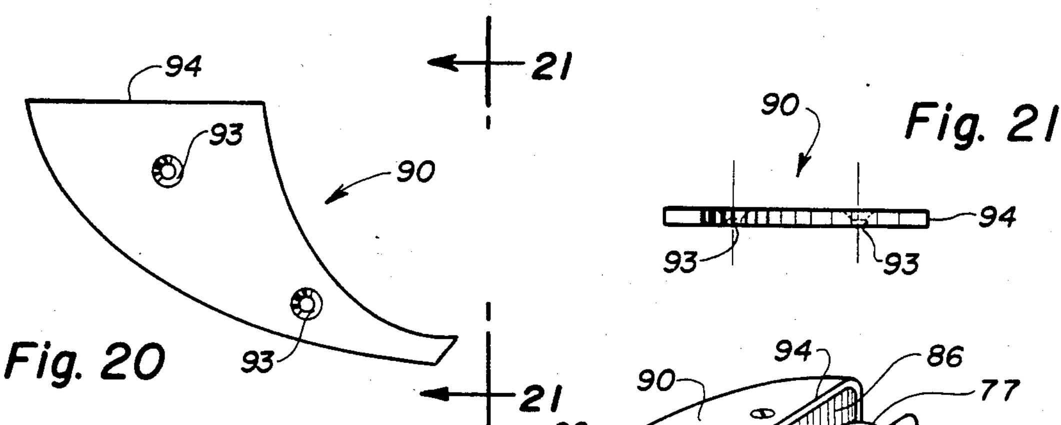
94
93
90
93
Fig. 20
21
21
90
Fig. 21
94
93
93
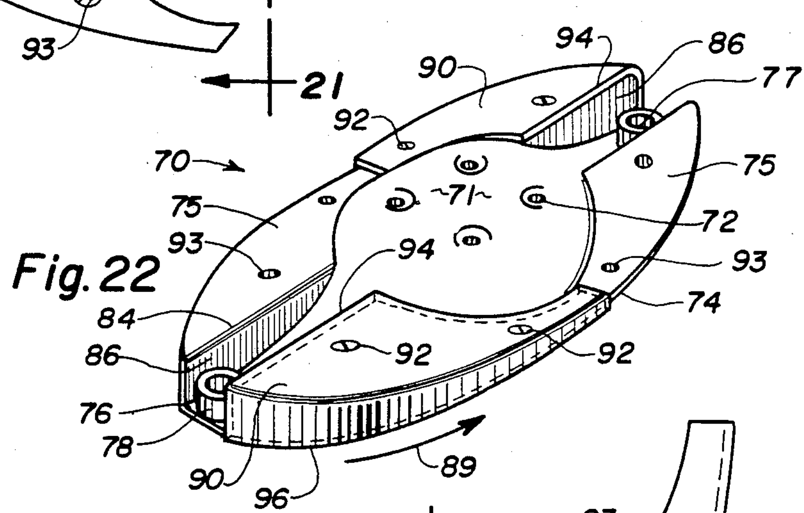
Fig. 22
70
75
93
84
86
76
78
90
96
90
92
94
86
77
71
72
75
93
94
74
92
92
89
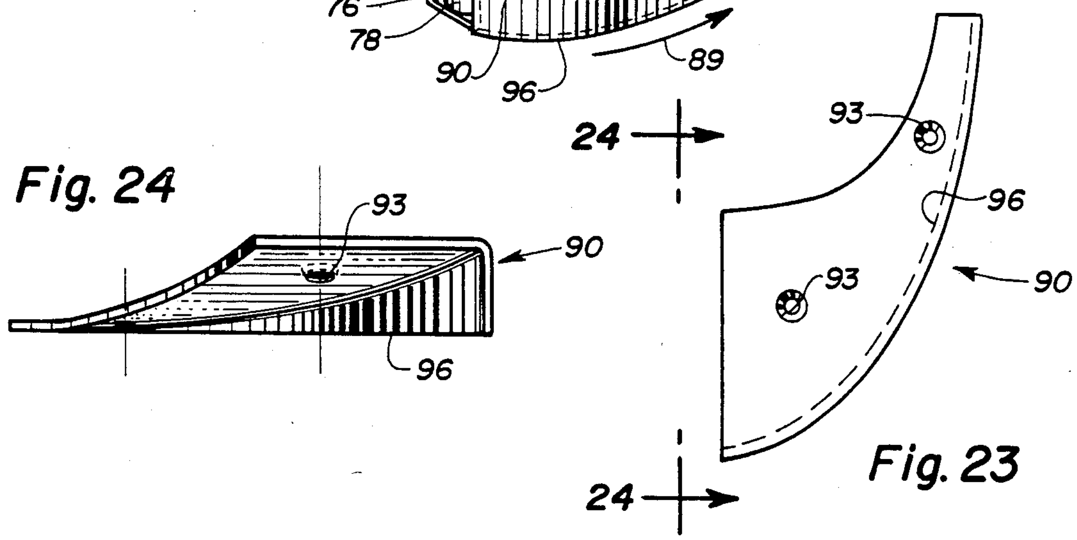
Fig. 24
93
90
96
24
24
93
96
93
90
Fig. 23

FULL QUADRANT CROP LIFTER FOR DISC MOWER-CONDITIONERS

BACKGROUND OF THE INVENTION

The present invention relates generally to disc mower-conditioners, and more particularly, to crop lifters for the rotatable disc cutter members.

Mower-conditioners have been provided for a number of years to sever standing crop material and convey the severed crop material rearwardly into a conditioning mechanism without depositing the severed crop upon the ground. A disc mower-conditioner utilizes a disc cutterbar having a number of transversely spaced disc cutter members rotatable to sever standing crop material by an impact action. A conditioning mechanism is mounted rearwardly of the disc cutterbar to receive the severed crop material directly from the disc cutter units without need of an intermediate crop conveying mechanism.

It has been found that certain crops, such as oats, rye, bluegrass and sorghum-sudan hybrids, when harvested by a disc mower-conditioner, have a tendency to build up in front of the disc cutters after being severed, resulting in a laying down of uncut crop material before it can be severed by the disc cutters. Under these conditions, the crop material being cut leaves a long stubble. In addition, certain crops have a tendency to feed under the lower conditioning roll after being severed and, thereby, escape the conditioning treatment. Assistance in feeding severed crop into the conditioning mechanism is desirable. Furthermore, the rapid rotation of the disc cutters creates a high rate of wear under abrasive crop and/or soil conditions, subjecting the hardware detachably connecting the knives to the disc cutters to a great amount of wear, requiring frequent replacement of the knife fastening hardware. Furthermore, it is desirable to handle the severed crop material in as gentle a manner as possible.

SUMMARY OF THE INVENTION

It is an object of this invention to overcome the aforementioned disadvantages of the prior art by providing a crop lifter for the disc cutter members of a disc mower-conditioner.

It is another object of this invention to protect the knife fastening hardware from excessive wear by providing a protective crop lifter in leading relationship to the knife hardware.

It is still another object of this invention to provide a crop lifter to elevate severed crop material from the area in front of the disc cutters before the knives can sever fresh crop material.

It is a feature of this invention that the trailing edge of the crop lifter is in substantially the same plane as the raised central portion of the disc cutter.

It is another feature of this invention that the crop lifter can be detachably affixed to the disc cutter.

It is an advantage of this invention that the crop lifter protects the knife hardware from abrasive wear.

It is still another feature of this invention that the knife hardware can be utilitzed to help detachably connect the crop lifter to the disc cutter.

It is another advantage of this invention that the severed crop material will not build up in front of the disc cutters to hinder the severing of standing crop material.

It is still another advantage of this invention that the harvesting operation of a disc mower-conditioner is made more efficient.

It is still another object of this invention to improve the feeding characteristics of severed crop material from the disc cutterbar to a rearwardly mounted conditioning mechanism without utilization of an intermediate crop conveying mechanism.

It is a further advantage of this invention that the operative life of the disc cutters is increased by the use of crop lifters.

It is a further object of this invention to provide a crop lifter for rotatable disc cutters that impact a gentle, minimally aggressive lifting action to severed crop material.

It is yet another feature of this invention that the lifting ramps of the crop lifters extend for substantially a full quadrant of the perimeter of the disc cutter.

It is yet a further advantage of this invention that the severed crop material is fed to the conditioning rolls with a crop lifting action that minimizes damage to the severed crop material.

It is yet a further object of this invention to provide a crop lifter for the disc cutter members of a disc mower-conditioner that is durable in construction, inexpensive of manufacture, carefree of maintenance, facile in assemblage, and simple and effective in use.

These and other objects, features and advantages are accomplished according to the instant invention by providing a disc mower-conditioner having a disc cutterbar with transversely spaced rotatable disc cutters to sever standing crop material by an impact action and a rotatable conditioning mechanism mounted rearwardly of the cutterbar to receive and condition severed crop material, wherein each disc cutter is provided with a crop lifter affixed to the peripheral portion of the disc cutter adjacent each knife in leading relationship thereto. The crop lifter has an inclined ramp extending substantially a full quadrant of the disc cutter and being operable to lift previously severed crop material away from the corresponding knife before the knife severs standing crop material and to feed the severed crop material into the conditioning mechanism. The top of the crop lifter is positioned in substantially the same plane as the raised central portion of the disc cutter for properly lifting the severed crop material toward the conditioning mechanism and for protecting the hardware detachably fastening the knife to the disc cutter.

BRIEF DESCRIPTION OF THE DRAWINGS

The advantages of this invention will become apparent upon consideration of the following detailed disclosure of the invention, especially when taken in conjunction with the following drawings wherein:

FIG. 19 is a perspective view of a disc cutter member similar to the view of FIG. 16 but with the ramp portions being equipped with replaceable wear members;

FIG. 20 is a top plan view of one of the wear members seen in FIG. 19;

FIG. 21 is a peripheral side elevational view of the wear member seen in FIG. 20, corresponding to lines 21—21;

FIG. 22 is a perspective view of a disc cutter member similar to the view seen in FIG. 19, but with the ramp portions being equipped with an alternative embodiment of a replaceable wear member;

FIG. 23 is a top plan view of the wear member seen in FIG. 22; and

FIG. 24 is a trailing side elevational view of the wear member corresponding to lines 24—24 of FIG. 23.

DETAILED DESCRIPTION OF THE PREFERRED EMBODIMENT

Figure 1:
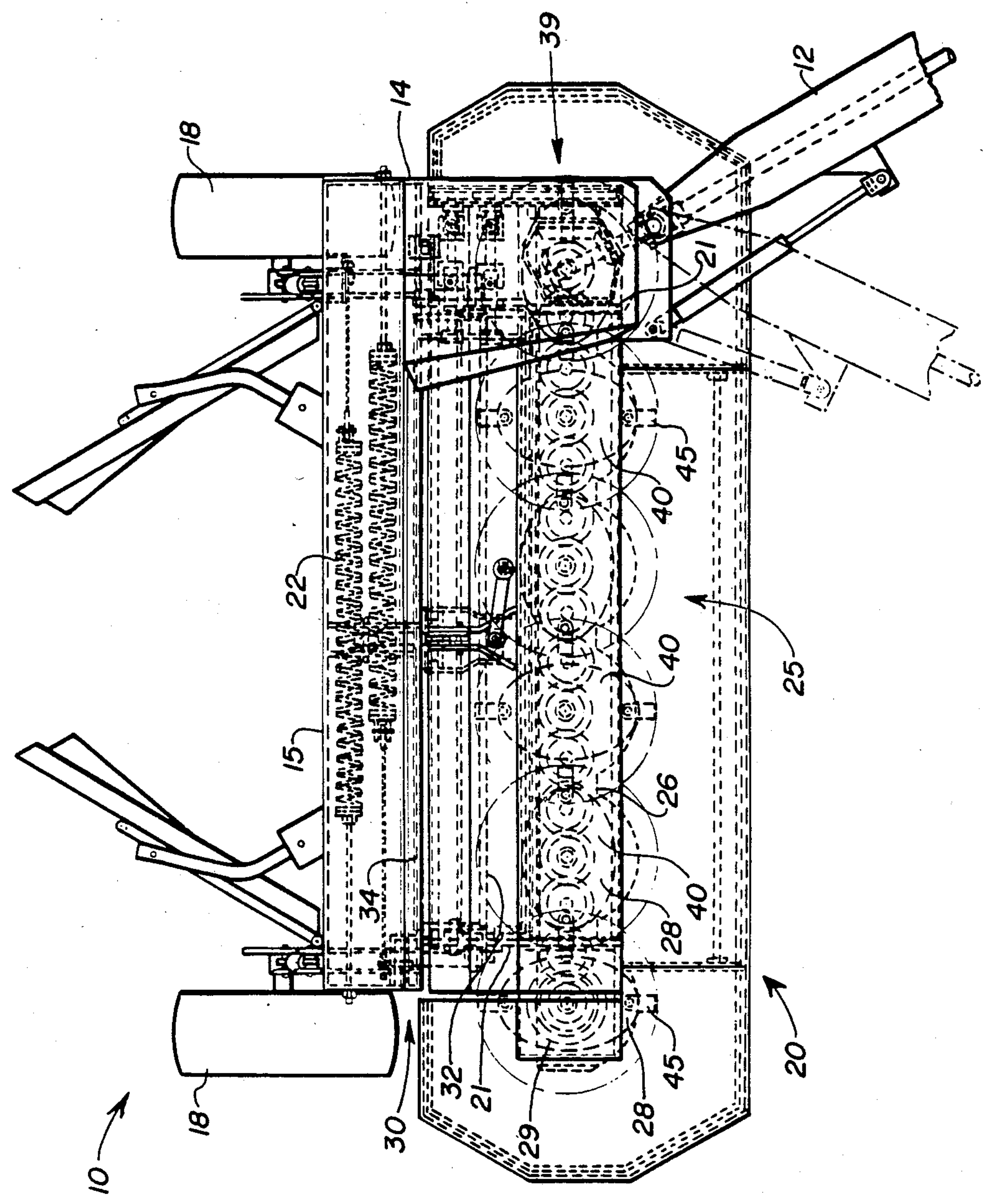
FIG. 1 is a top plan view of a disc mower-conditoner incorporating the principles of the instant invention, a portion of the draft member being broken away.

Referring now to the drawings, and particularly to FIG. 1, a top plan view of a hay harvesting machine, commonly referred to as a disc mower-conditioner can be seen. Any left and right references are used as a matter of convenience and are determined by standing at the rear of the mower-conditioner, facing the forward end, the direction of travel. The mower-conditioner 10 is shown in the form of a pull-type machine having a draft member 12 pivotably connected to the frame 14 of the machine 10. The frame 14 includes a main transverse support beam 15 to which are connected downwardly depending legs 17 mounting wheels 18 for mobilely supporting the machine 10 over the ground G, as best seen in FIG. 2.

Figure 2:
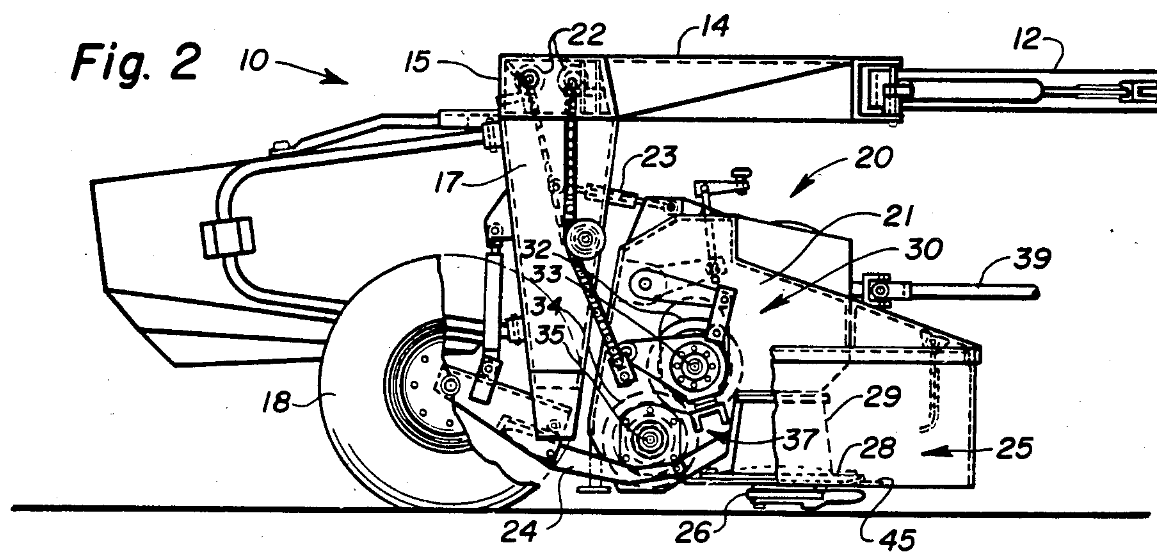
FIG. 2 is a side elevational view of the disc mower-conditioner seen in FIG. 1 with portions being broken away to better show the environment of the invention.

Referring to FIGS. 1 and 2, the mower-conditioner 10 includes a crop harvesting header 20 floatingly supported for movement with the ground G relative to the frame 14 by the counter balancing mechanism 22 and upper and lower links 23,24 interconnecting the header 20 and the frame 14. The header 20 is provided with a crop cutting mechanism 25, seen in the form of a disc cutterbar 26, such as a Kuhn three meter, six rotor rotary cutterbar, having a plurality of transversely spaced disc cutter members 28 operable to sever standing crop material by an impact action. A conditioning mechanism 30 is mounted in the header 20 rearwardly of the cutting mechanism 25 to receive and condition crop material severed by the cutterbar 26.

The conditioning mechanism 30 included a pair of cooperable, generally vertically spaced transverse conditioning rolls 32,34 operable to condition severed crop material passing therebetween. Each roll 32,34 is rotatably supported between the header side sheets 21 such that the axis of rotation 33 of the upper conditioning roll 32 is spaced slightly forwardly of the axis of rotation 35 of the lower conditioning roll 34, so that the nip 37 formed therebetween is facing slightly downwardly toward the disc cutterbar 26. The preferred embodiment of the conditioning roll construction shown in FIGS. 1 and 2 is of the intermeshing lug design. A conventional drive mechanism 39 provides a source of rotational power to both the disc cutterbar 26 and the conditioning mechanism 30.

Figure 3:
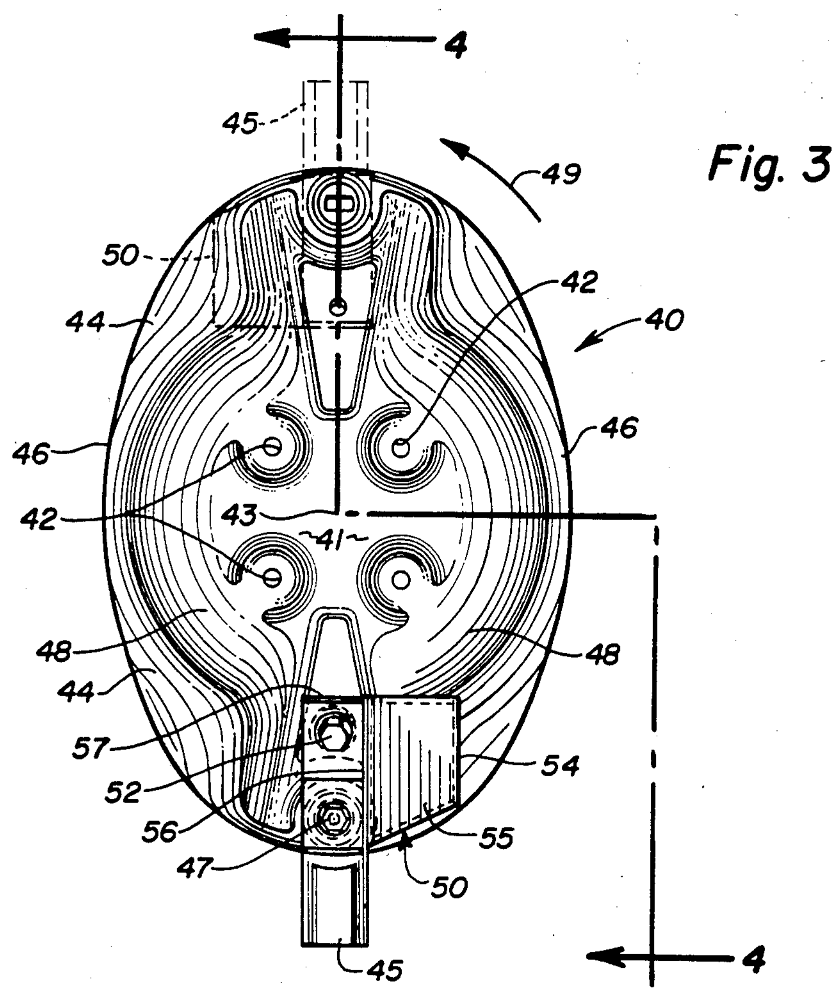
FIG. 3 is an enlarged top plan view of a disc cutter member having one crop lifter and knife attached thereto, the opposing crop lifter and knife being shown in phantom.
Figure 4:
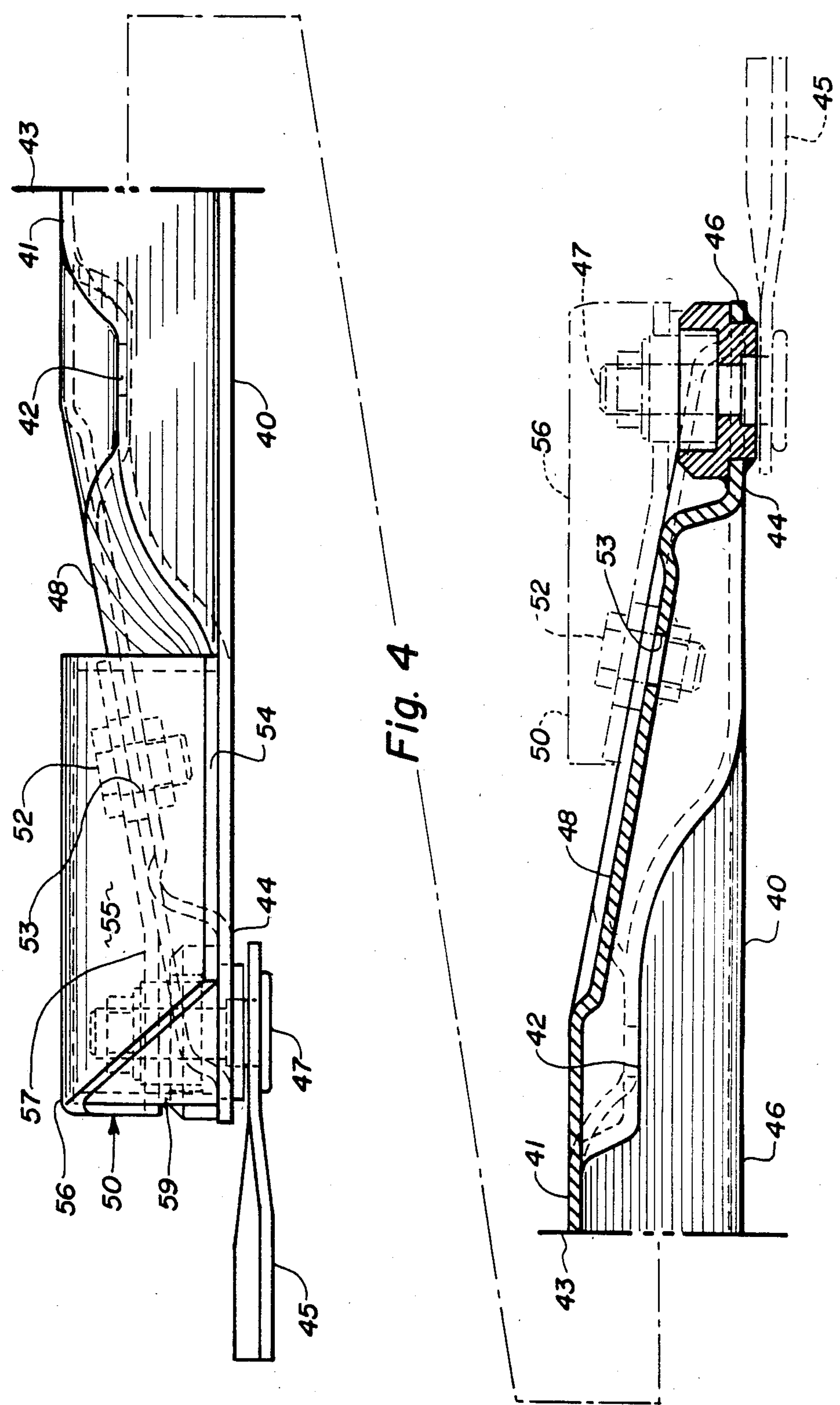
FIG. 4 is an enlarged cross-sectional view of the disc cutter member seen in FIG. 3, taken along lines 4—4, the view of the disc member being split at the axis of rotation to better show the details of construction.
Figure 5:
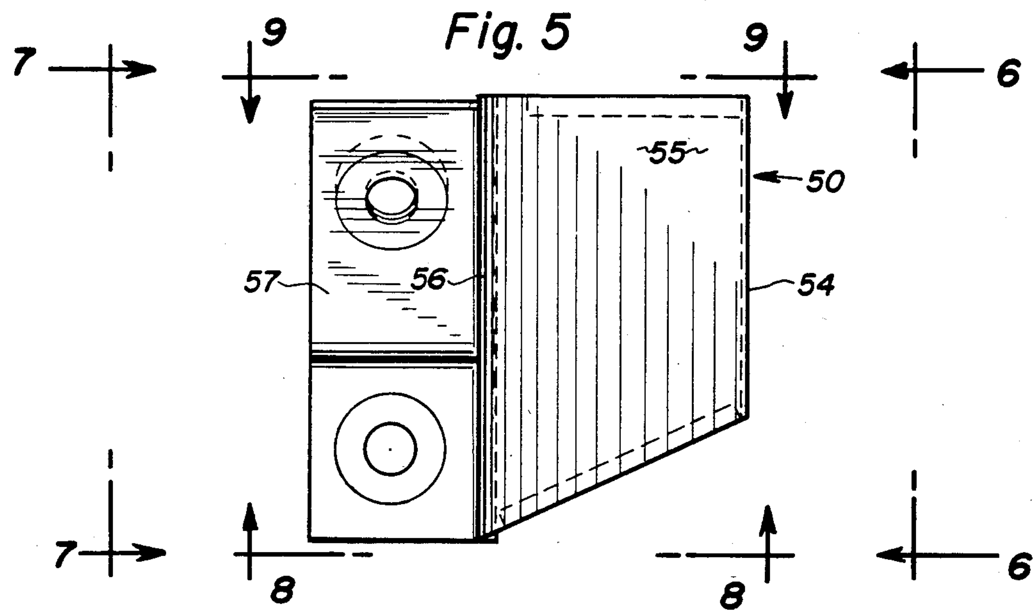
FIG. 5 is an enlarged top plan detail view of the crop lifter seen in FIGS. 3 and 4.
Figure 6:
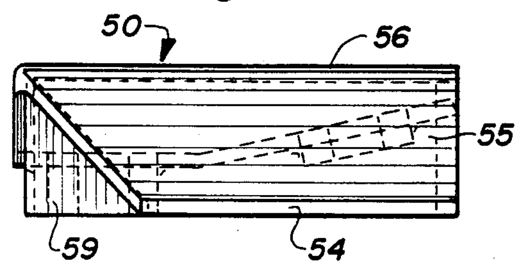
FIG. 6 is a leading side elevational view of the crop lifter corresponding to lines 6—6 of FIG. 5.

Referring now to FIGS. 3 and 4, the disc cutter members 28 can best be seen. Although the transversely opposed endmost disc cutter members 28, as best seen in FIGS. 1 and 2, are provided with a truncated cone 29 to provide a more aggressive crop conveying action, each of the remaining interior disc cutters 40 will have a construction as shown in FIGS. 3 and 4. Each disc member 40 includes a raised central portion 41 in which are formed recessed mounting holes 42 for connection of the disc 40 to a driving member (not shown) in a conventional manner. The axis of rotation 43 of the disc cutter 40 is positioned in the center of the raised central portion 41. The disc cutter member 40 also includes a lower peripheral portion 44 terminating in a peripheral edge 46 extending around the circumference of the oval shaped disc member 40.

Each disc cutter 40 is provided with a pair of diametrically opposed knives 45 detachably connected to the peripheral portion 44 by fasteners 47. Upon rotation of the disc cutter 40, the knives 45 sever standing crop material by an impact action. The disc member 40 also includes an intermediate sloped portion 48 interconnecting the raised central portion 41 and the lower peripheral portion 44. A crop lifter 50 is shown in FIGS. 3 and 4 as attached to the peripheral portion 44 of the disc member 40 adjacent to each knife 45 and in leading relationship thereto, when viewed in the direction of rotation of the disc member 40, indicated by the arrow 49. The crop lifter 50 is detachably connected to the disc member 40 by the knife fastener 47 and a second fastener 52 extending through an opening 53 in the intermediate sloped portion 48 of the disc member 40.

Figure 7:
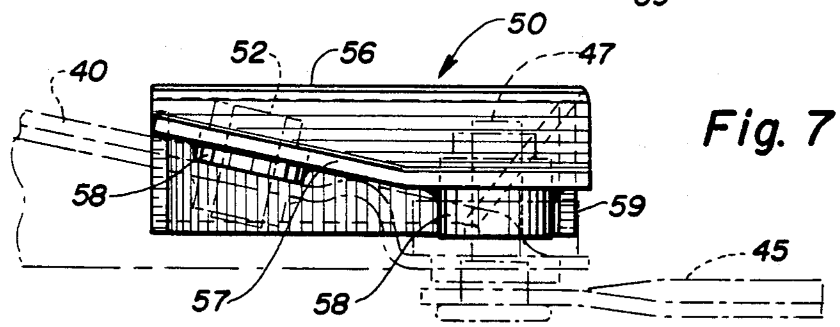
FIG. 7 is a trailing side elevational view of the crop lifter taken along lines 7—7 of FIG. 5, the corresponding portions of the disc cutter member, the knife and attaching hardware being shown in phantom.
Figure 8:
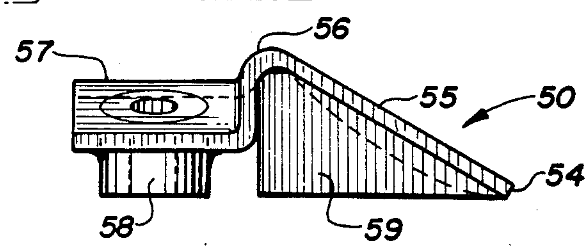
FIG. 8 is a peripheral side elevational view of the crop lifter taken along lines 8—8 of FIG. 5.
Figure 9:
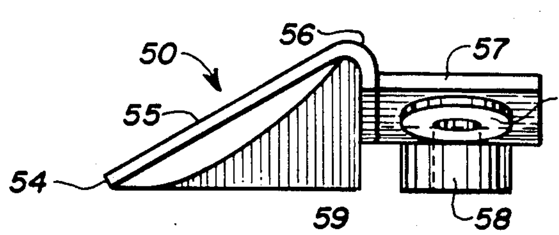
FIG. 9 is a radially inward side elevational view of the crop lifter corresponding to lines 9—9 of FIG. 5.
Figure 10:
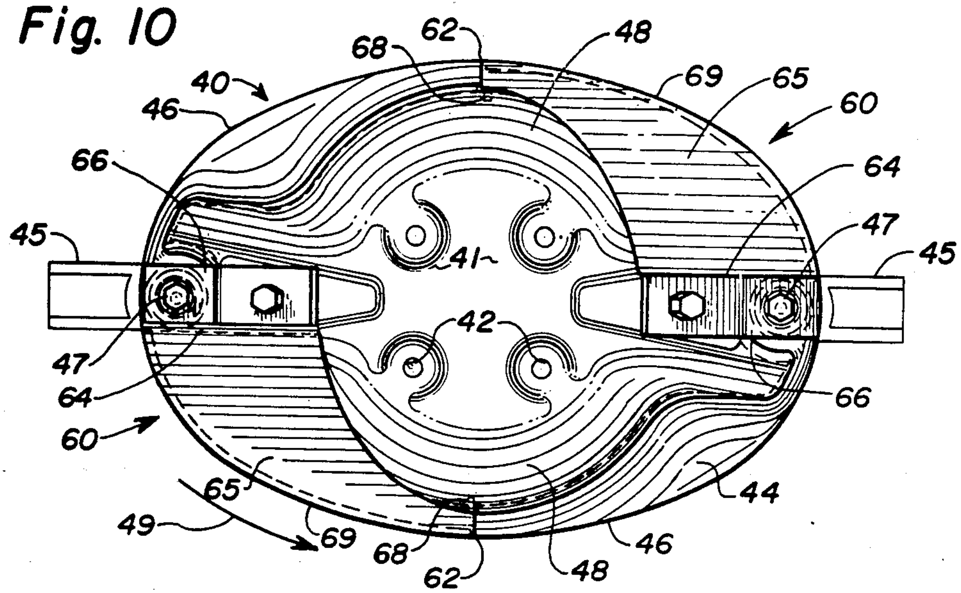
FIG. 10 is a top plan view of a disc cutter member, similar to the view seen in FIG. 3, but being provided with an alternative crop lifter embodiment.
Figure 11:
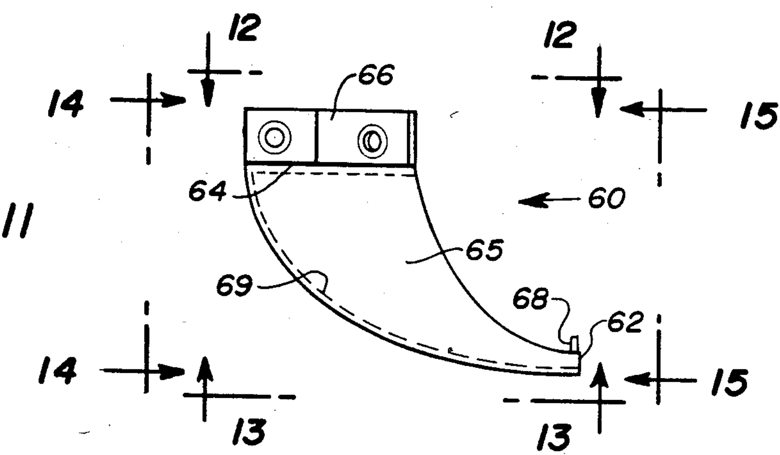
FIG. 11 is a top plan view of the crop lifter seen in FIG. 10.
Figure 12:
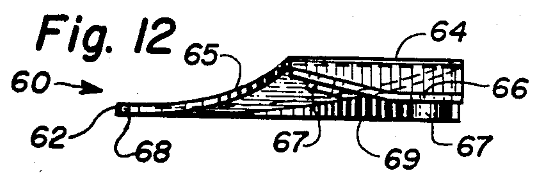
FIG. 12 is a trailing side elevational view of the crop lifter corresponding to lines 12—12 of FIG. 11.
Figure 13:
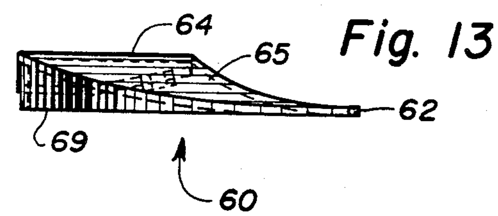
FIG. 13 is a leading side elevational view of the crop lifter corresponding to lines 13—13 of FIG. 11.
Figure 14:
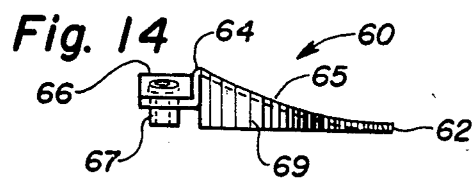
FIG. 14 is a peripheral side elevational view of the crop lifter corresponding to lines 14—14 of FIG. 11.
Figure 15:
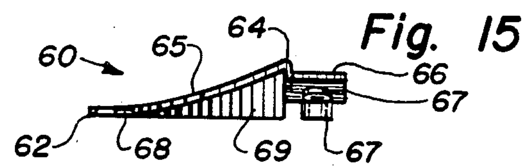
FIG. 15 is a radially inward side elevational view of the crop lifter corresponding to lines 15—15 of FIG. 11.

Referring now to FIGS. 3-9, the details of the crop lifter 50 can best be seen. The crop lifter 50 includes a lower leading edge 54 and a raised trailing edge 56 interconnected by an inclined ramp portion 55. A recessed connecting portion 57 is affixed to the trailing edge 56 to provide a means for connecting the lifter 50 to the disc member 40. As is best seen in FIGS. 4 and 7, the connecting portion 57 is shaped to correspond to the peripheral and intermediate sloped portions 44,48 of the disc member 40 to which the lifter 50 is attached. The connecting portion 57 is recessed sufficiently below the trailing edge 56 to permit the connecting hardware 47,52 to be protected behind the crop lifter 50. The connecting portion 57 is provided with spacers 58 to facilitate a tight mounting connection of the lifter 50 onto the disc member 40. Along the peripheral edge of the lifter 50, the inclined ramp portion 55 is provided with an apron 59 extending circumferentially from the leading edge 54 to the trailing edge 56 and vertically from the inclined ramp portion 55 downwardly to the lower peripheral portion 44 of the disc member 40. The purpose of the apron 59 is to lend rigidity and support to the inclined ramp portion 55 and to prevent a buildup of debris between the lifter 50 and the disc member 40.

As best seen in FIG. 4, the height of the trailing edge 56 of the lifter 50 is in approximately the same plane as the height of the raised central portion 41 of the disc member 40. The positioning of the lifter 50 in leading relationship to the corresponding knife 45 permits the lifter 50 to protect the mounting hardware 47 for the knife 45 from abrasive wear. The inclined ramp portion 55 provides an aggressive lifting action to previously severed crop material to lift such material from the immediately trailing cutting zone for the corresponding knife 45. This lifting action helps prevent severed crop material from passing beneath the conditioning mechanism 30 and also helps to feed the severerd crop material into the nip 37 of the conditioning rolls 32,34 to effect a conditioning thereof. One skilled in the art will readily realize that the lifter 50 will be subject to abrasive wear from the typical cutting conditions in which rotary cutterbars are normally used; however, the detachably connected lifter 50 can easily be replaced to extend the operative life of the more expensive disc member 40. The replacement of the lifter 50 can be accomplished at a significant cost savings when compared to a replacement of the entire disc member 40.

Referring now to FIGS. 10–15, a second crop lifter embodiment 60 can be seen. The crop lifter 60 is somewhat similar to the embodiment shown in FIGS. 3–9. The lifter 60 includes a leading edge 62, a trailing edge 64, and an inclined ramp 65 interconnecting the leading and trailing edges 62,64. A recessed connecting portion 66 with appropriate spacers 67 detachably connect the trailing edge 64 of the lifter 60 to the lower and intermediate sloped portions 44,48 of the disc member 40 with the connecting hardware 47,52. The leading edge 62 of the lifter 60 is provided with a restraining pin 68 engageable with a corresponding opening appropriately positioned within the intermediate sloped portion 48. The restraining pin 68 restricts the movement of the leading edge 62 and helps locate the position of the lifter 60 relative to peripheral edge 46 of the disc member 40.

The inclined ramp 65 extends for substantially an entire quadrant of the peripheral portion 44 of the disc member 40, such that the orientation of the leading edge 62 is disposed at approximately 90 degrees to the orientation of the trailing edge 64. The width of the inclined ramp 65 increases from the leading edge 62 to the trailing edge 64, creating a pork-chop-like shape. This longer, gradually sloping ramp 65 provides a more gradual lifting of the severed crop material, to create a less aggressive crop lifting action than will be obtained from the crop lifter 50 described above. The provision of the peripheral apron 69 extending circumferentially from the leading edge 62 to the trailing edge 64 and vertically between the inclined ramp 65 and the peripheral edge 46 of the disc cutter 40 lends support to the inclined ramp 65 and prevents the entrance of crop material and/or other debris into the cavity formed between the inclined ramp 65 and the disc member 40. As with the lifter 50, the highest point of the lifter 60 is at the trailing edge 64, which preferably should extend to substantially the same plane as the raised central portion 41. The connecting portion 66 is recessed sufficiently to permit the raised trailing edge 64 to protect the connecting hardware 47,52.

Figure 16:
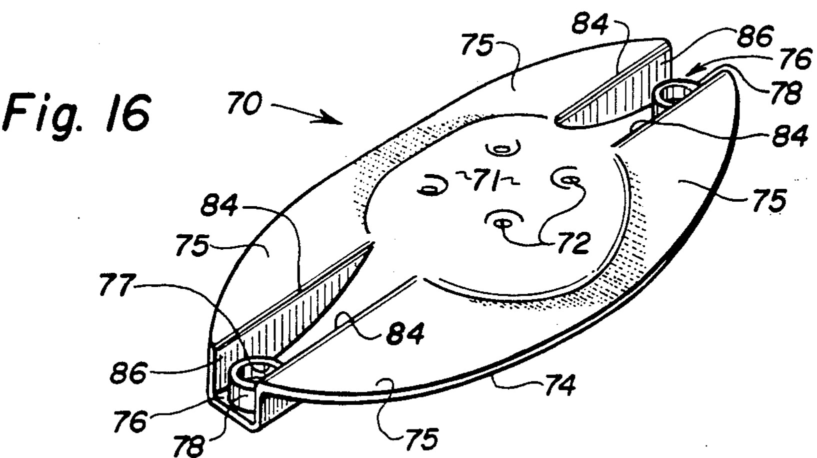
FIG. 16 is a perspective view of a disc cutter member integrally incorporating crop lifting ramp portions.
Figure 17:
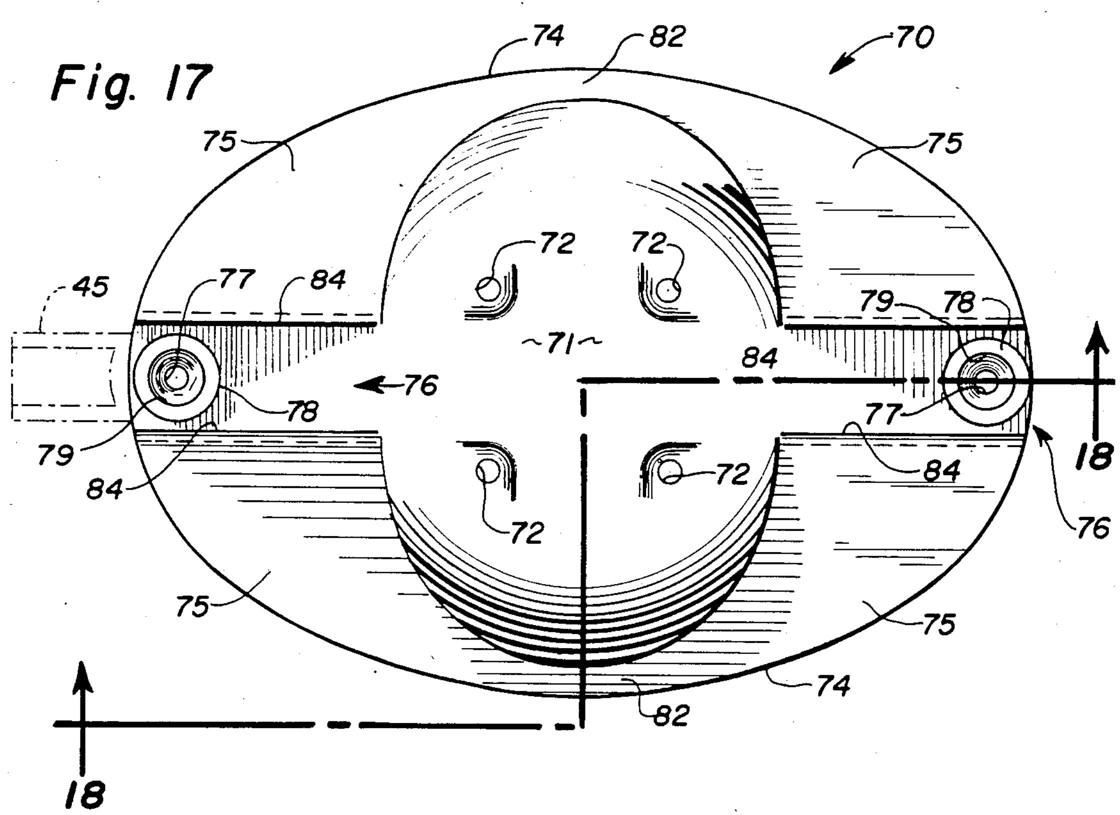
FIG. 17 is an enlarged top plan view of the disc cutter member seen in FIG. 16, the position of one of the knives being shown in phantom.
Figure 18:
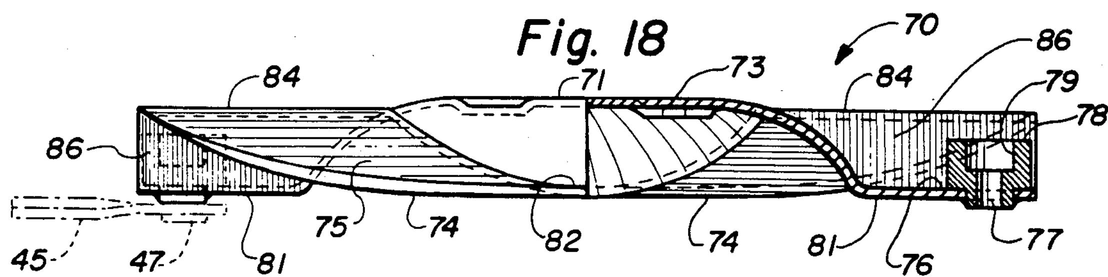
FIG. 18 is a cross-sectional view of the disc cutter member seen in FIG. 17 taken along lines 18—18.

Referring now to FIGS. 16–18, a new disc cutter member 70 integrally incorporating lifting ramps 75 can be seen. The central portion 71 corresponding to the axis of rotation of the disc member 70 is raised and is provided with recessed mounting holes 72 for conventional attachment to a driving member (not shown). The oval-shaped disc member 70 is defined by a circumferential peripheral edge 74. Circumferentially opposed along the major axis of the oval-shaped disc member 70 are knife mounting holes 77 formed in a lower trench-like portion 76 defining a bottom plane 81 of the disc member 70 disposed below an upper plane 73 defined by the raised central portion 71. The knife mounting holes 77 are provided with protection collars 78 having a countersunk opening 79 formed therein to provide greater protection for the knife mounting hardware 47.

The disc member 70 is provided with a lower peripheral portion 82 at circumferentailly opposed positions along the minor axis of the disc member 70. The lower peripheral portions 82 are displaced 90 degrees around the circumference 74 of the disc member 70 from the knife mounting hole 77. The lower peripheral portions 82 are positioned in the bottom plane 81 with the trench portion 76. From each lower peripheral portion 82, an inclined ramp 75 extends toward each knife mounting hole 77. Each inclined ramp 75 terminates in a raised trailing edge 84 extending to or near the upper plane 73 defined by the raised central portion 71. The trailing edges 84 can be positioned slightly below the upper plane 73 to accommodate the attachment of wear plates 90, as will be described in further detail below with respect to FIGS. 19–24.

The vertical sides 86 extend from the trailing edges 84 downwardly to the lower trench portion 76, thereby defining the sides of the trench portion 76, to lend additional protection to the knife hardware 47. Since the disc member 70 is provided with four opposingly directed lifting ramps 75, one skilled in the art will readily realize that the disc member 70 can be mounted on the cutterbar 26 for rotation in either the clockwise or counterclockwise directions during operation. With the lifting ramps 75 extending for substantially an entire quadrant of the peripheral edge of the disc member 70, the disc member 70 will impart a gentle, less aggressive action to the severed crop material to clear the cutting path for the associated knife 45.

As can be seen in FIGS. 19–24, the disc member 70 can be provided with wear plates 90 affixed to the leading lifting ramps 75, when viewed in the direction of rotation indicated by the arrow 89. As best seen in FIGS. 19–21, one embodiment of the wear plate 90 will comprise a pork-chop-shaped flat plate affixed to the leading lifting ramps 75 by fasteners 92 engaged with appropriate holes 94 formed in the lifting ramp 75. Since the leading ramp 75 will be subjected to the greatest amount of abrasive wear during operation of the disc member 70, the utilization of replaceable wear plates 90 will provide a greater economic and operative life for the disc member 70. As indicated above with respect to FIG. 18, the trailing edge 94 of the wear plate 90 would position the resulting trailing edge 84 of the lifting ramp 75 in substantially the same plane 73 as the raised central portion 71 of the disc member 70.

An alternative embodiment of the wear plate 90 can be seen in FIGS. 22-24. The wear plate 90 includes a generally vertically extending apron 96 positioned along the peripheral edge of the wear plate 90. The apron 96 would present a solid face to the severed crop material to be lifted by the ramps 75, upon rotation of the disc member 70 to prevent crop material and/or other debris from being jammed underneath the lifting ramp 75 and also to protect the vertical sides 86 of the trench portion 76 from abrasive wear.

It will be understood that changes in the details, material, steps and arrangement of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without department from the scope of the invention. Accordingly, the following claims are intended to protect the invention broadly as well as in the specific form shown.

Having thus described the invention, what is claimed is:

1. In a disc mower-conditioner having a mobile frame adapted for forward movement over the ground; rotary cutting means supported by said frame adjacent the ground to sever standing crop material, said rotary cutting means including a transverse cutterbar rotatably mounting a plurality of transversely spaced disc cutters having knives operable to sever standing crop material upon rotation of said cutters, each said knife being detachably connected to said disc cutter by a knife fastener, each said disc cutter having a raised central portion and a lower peripheral portion terminating in a circumferential peripheral edge; crop conditioning means mounted generally rearwardly of said rotary cutting means to condition crop material severed by said disc cutters, the improvement comprising:

an inclined ramp crop lifter affixed to each said disc cutter adjacent said knife in leading relationship thereto, as seen looking in the direction of rotation of said disc cutter, to lift previously severed crop material away from said knife before severing said standing crop material, said inclined ramp crop lifter having an inclined ramp portion extending substantially a quadrant of said peripheral edge of said disc cutter to create a generally gradual slope to said inclined ramp, said inclined ramp portion extending from a lower leading edge to a raised trailing edge, the radially extending width of said inclined ramp portion generally increasing from said leading edge to said trailing edge, each said crop lifter being detachably connected to the respective said disc cutter by the corresponding said knife fastener, said leading edge of said crop lifters being provided with a restraining pin engageable with said disc cutter to restrict the movement of said leading edge, said inclined ramp crop lifter further including a generally vertical apron extending peripherally from said leading edge to said trailing edge and generally vertically from said inclined ramp portion to said disc cutter.

2. The disc mower-conditioner of claim 1 wherein said trailing edge is affixed to a lowered connecting portion for detachably connecting said crop lifter to the respective said disc cutter.

3. The disc mower-conditioner of claim 1 wherein said trailing edge of said crop lifters is in substantially the same place as said raised central portion of said disc cutters.

4. The disc mower-conditioner of claim 3 wherein each said disc cutter is provided with two diametrically opposed knives and a crop lifter corresponding to each said knife.

5. The disc mower-conditioner of claim 3 wherein said connecting portion of said crop lifters is positioned relative to said raised trailing edge such that said knife fasteners connecting said crop lifters to said disc cutters is at a height lower than said trailing edge so that said crop lifter protects said knife fastener from wear.

6. In a disc mower-conditioner having a mobile frame adapted for forward movement over the ground; rotary cutting means supported by said frame adjacent the ground to sever standing crop material, said rotary cutting means including a transverse cutterbar rotatably mounting a plurality of transversely spaced disc cutters having operable to sever standing crop material upon rotation of said cutters, each said disc cutter having a raised central portion and a lower peripheral portion terminating in a circumferential peripheral edge; crop conditioning means mounted generally rearwardly of said rotary cutting means to condition crop material severed by said disc cutters, the improvement comprising:

an inclined ramp crop lifter affixed to each said disc cutter adjacent said knife in leading relationship thereto as seen looking in the direction of rotation of said disc cutter, to lift previously severed crop material away from said knife before severing said standing crop material, said inclined ramp crop lifter having an inclined ramp portion extending substantially a quadrant of said peripheral edge of said disc cutter from a lower leading edge to a raised trailing edge to create a generally gradual slope to said inclined ramp and an apron extending peripherally from said leading edge to said trailing edge and generally vertically from said inclined ramp portion to said disc cutter.

7. The disc mower-conditioner of claim 6 wherein said inclined ramp portion has a radially extending width which increases from said leading edge to said trailing edge.

8. The disc mower-conditioner of claim 7 wherein said knives are detachably connected to the respective disc cutters by knife fasteners, each crop lifter being connected to said disc cutter by the corresponding said knife fastener.

9. The disc mower-conditioner of claim 8 wherein said leading edge of said crop lifters is provided with a restraining pin engageable with said disc cutter to restrict the movement of said leading edge.

10. The disc mower-conditioner of claim 9 wherein said connecting portion of said crop lifters is positioned relative to said raised trailing edge such that said knife fasteners connecting said crop lifters to said disc cutters is at a height lower than said trailing edge so that said crop lifter protects said knife fastener from wear.

* * * * *